US009866494B2

(12) United States Patent
Chandra et al.

(10) Patent No.: US 9,866,494 B2
(45) Date of Patent: Jan. 9, 2018

(54) WIRELESS COMMUNICATION USING DELAYED FRAME TRANSMISSION

(71) Applicant: Microsoft Technology Licensing, LLC, Redmond, WA (US)

(72) Inventors: Ranveer Chandra, Kirkland, WA (US); David W. Russo, Woodinville, WA (US); Hang Yu, Houston, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 14/932,568

(22) Filed: Nov. 4, 2015

(65) Prior Publication Data

US 2017/0126576 A1    May 4, 2017

(51) Int. Cl.
| | |
|---|---|
| *H04L 12/875* | (2013.01) |
| *H04L 12/26* | (2006.01) |
| *H04L 12/801* | (2013.01) |
| *H04W 74/08* | (2009.01) |
| *H04L 1/18* | (2006.01) |

(52) U.S. Cl.
CPC .......... *H04L 47/564* (2013.01); *H04L 1/1829* (2013.01); *H04L 43/16* (2013.01); *H04L 47/18* (2013.01); *H04W 74/0833* (2013.01); *H04L 1/1803* (2013.01); *H04L 1/1806* (2013.01); *H04L 1/1809* (2013.01)

(58) Field of Classification Search
CPC ..... H04L 47/564; H04L 1/1829; H04L 43/16; H04L 47/18; H04L 1/1809; H04L 1/1806; H04L 1/1803; H04W 74/0833
See application file for complete search history.

(56) References Cited

U.S. PATENT DOCUMENTS

| | | | |
|---|---|---|---|
| 6,041,048 | A | 3/2000 | Erickson et al. |
| 7,590,061 | B2 | 9/2009 | Barry et al. |
| 7,948,897 | B2 | 5/2011 | Stuart et al. |
| 8,730,802 | B2 | 5/2014 | Munje |
| 8,730,990 | B2 | 5/2014 | Ghosh et al. |
| 8,897,222 | B2 | 11/2014 | Sundberg |

(Continued)

FOREIGN PATENT DOCUMENTS

| | | |
|---|---|---|
| EP | 2862404 A1 | 4/2015 |
| KR | 20140081500 A | 7/2014 |

OTHER PUBLICATIONS

Zhang, et al., "Traffic Aware Medium Access Control Protocol for Wireless Sensor Networks", In Proceedings of 7th ACM International Symposium on Mobility Management and Wireless Access, Oct. 26, 2009, pp. 140-148.

(Continued)

*Primary Examiner* — Thai Nguyen
(74) *Attorney, Agent, or Firm* — International IP Law Group, PLLC

(57) ABSTRACT

The disclosed subject matter includes techniques for delaying network frames. In some examples, a system for delaying network frames can include a processor and a computer-readable memory storage device for storing executable instructions that can be executed by the processor to cause the processor to identify a network frame to be transmitted to a host device at a client device. The processor can also delay transmission of the network frame to the host device based at least on the network information and a frame deadline.

13 Claims, 6 Drawing Sheets

(56) References Cited

U.S. PATENT DOCUMENTS

| | | |
|---|---|---|
| 9,166,943 B2 | 10/2015 | Hamilton, II et al. |
| 2004/0165532 A1 | 8/2004 | Poor et al. |
| 2005/0169312 A1* | 8/2005 | Cakareski ............... H04L 29/06 370/473 |
| 2006/0227802 A1 | 10/2006 | Du et al. |
| 2007/0183326 A1 | 8/2007 | Igarashi et al. |
| 2008/0273533 A1* | 11/2008 | Deshpande ............. H04L 47/50 370/392 |
| 2011/0116371 A1 | 5/2011 | James |
| 2014/0155024 A1* | 6/2014 | Chetlur ................... H04W 4/26 455/406 |
| 2014/0280608 A1 | 9/2014 | Hamilton, II et al. |
| 2014/0349745 A1 | 11/2014 | Russo et al. |
| 2015/0181456 A1* | 6/2015 | Kim ...................... H04W 24/08 370/230 |

OTHER PUBLICATIONS

Chintalapudi, et al., "WiFi-NC : WiFi Over Narrow Channels", In Proceedings of 9th USENIX Conference on Networked Systems Design and Implementation, Apr. 25, 2012, pp. 1-14.

Wie, et al., "LEACH-Based Energy-Conserved Improved Protocol for WSNs", In International Journal of Digital Content Technology and its Applications, vol. 6, No. 23, Dec. 2012, pp. 163-171.

International Search Report and the Written Opinion of the International Searching Authority, Issue to PCT Application No. PCT/US2016/060600, dated May 26, 2017, 18 pages.

\* cited by examiner

400

WIRELESS COMMUNICATION USING DELAYED FRAME TRANSMISSION

BACKGROUND

Client devices and access points in a wireless network typically take turns contending for access to time on a shared network under the principle of packet fairness. For example, a client device and an access point may have equal opportunity for sending a frame. Transmitting data using packet fairness techniques can result in contention that can increase the latency for client devices and access points.

SUMMARY

The following presents a simplified summary of the innovation in order to provide a basic understanding of some aspects described herein. This summary is not an extensive overview of the disclosed subject matter. It is intended to neither identify key elements of the disclosed subject matter nor delineate the scope of the disclosed subject matter. Its sole purpose is to present some concepts of the disclosed subject matter in a simplified form as a prelude to the more detailed description that is presented later.

An implementation provides for a system for delaying network frames. The system can include a processor and a computer-readable memory storage device storing executable instructions that, based on an execution by the processor, cause the processor to identify a network frame to be transmitted to a host device at a client device. The instructions can also cause the processor to delay transmission of the network frame to the host device based at least on the network information and a frame deadline.

Another implementation provides a system for delaying network frames. The system can include a processor and a computer-readable memory storage device storing executable instructions that, based on an execution by the processor, cause the processor to queue a network frame to be sent to a client device. The instructions can also cause the processor to receive a delayed network frame from the client device. The instructions can also cause the processor to generate a data-acknowledgement (DACK) frame comprising the queued network frame and send the DACK frame to the client device within a predetermined time of receiving the delayed network frame.

Another implementation provides for a method for delaying network frames. The method can include identifying a network frame to be transmitted to a host device at a client device. The method can further include delaying transmission of the network frame to the host device based at least on the network information and the frame deadline.

The following description and the annexed drawings set forth in detail certain illustrative aspects of the disclosed subject matter. These aspects are indicative, however, of a few of the various ways in which the principles of the innovation may be employed and the disclosed subject matter is intended to include all such aspects and their equivalents. Other advantages and novel features of the disclosed subject matter will become apparent from the following detailed description of the innovation when considered in conjunction with the drawings.

DETAILED DESCRIPTION

Figure 1:
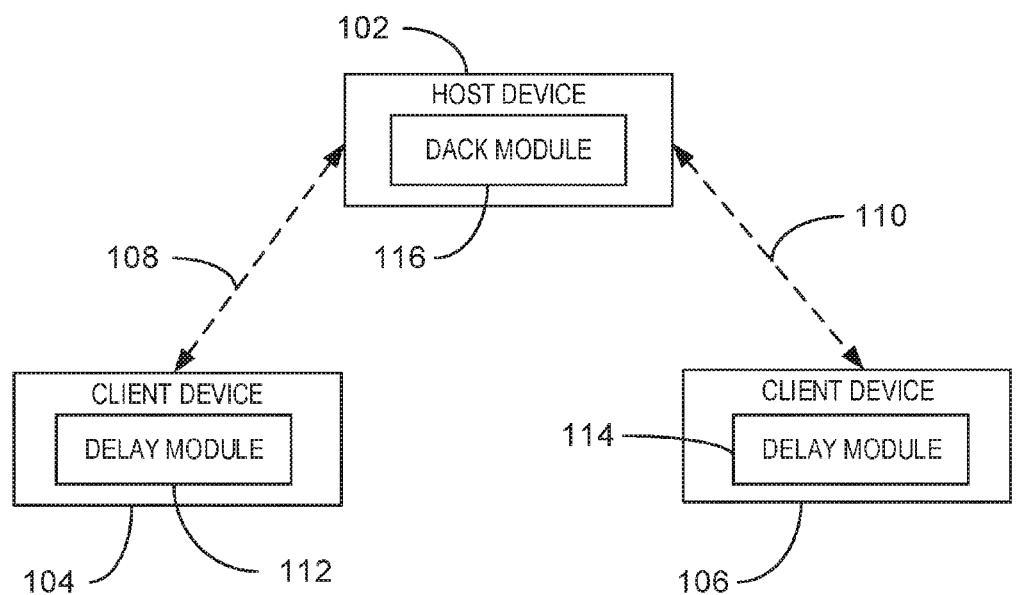
FIG. 1 is a block diagram of an example operating environment configured for implementing various aspects of the techniques described herein.

As mentioned above, transmitting data using packet fairness techniques can result in contention that can increase the latency for client devices and access points. Latency can be particularly increased in gaming scenarios, where network traffic is bidirectional. Consequently the amount of traffic from the access point increases linearly with the number of clients in the network. For example, in a network with 10 clients, an access point may have 10 times more frames to send than any of the individual clients. However, when using a wireless local area network such as Wi-Fi, the access point will have an equal probability to transmit data when compared to any other station, thereby causing a portion of the downlink frames to miss their deadlines.

This disclosure describes techniques for improved wireless communication using delayed transmission of frames from client devices. As used herein, a client device can refer to any computing device that sends uplink frames to a host device. An uplink frame, as used herein, refers to a frame being sent to a host device from a client device. For example, a client device can be a controller of a console. A host device, as used herein, refers to any computing device sending downlink frames. A downlink frame, as used herein, is a frame being sent from a host device to a client device. In some examples, a host device can be a gaming console. In some embodiments, a network frame can be identified and transmission of the frame delayed based on network information and a frame deadline. For example, the transmission of the frame can be delayed until a predetermined time before the frame deadline is reached. In some embodiments, the transmission of the network frame can be delayed until a downlink frame is detected at a host device. The network frame can be transmitted and a data-acknowledgement frame including the downlink frame can be received from the host within a predetermined time. A data-acknowledgment (DACK) frame, as used herein, refers to an acknowledgment frame that is sent to a client device with additional data for the client device within a predetermined time. For example, the predetermined time can be a Short Interframe Space (SIFS) period. A Short Interframe Space (SIFS) period, as used herein, refers to a time period in which a device can reply to a received frame without contending for a medium, such as for an acknowledgement frame.

The techniques thus enable a wireless network with reduced overall contention between network devices. For example, the techniques allow clients attempting to transmit frames with deadlines that are closer to expiration to be effectively prioritized via the delay of other frames. In addition, the techniques herein enable devices to avoid the contention associated with using acknowledgements. For example, a host device can send a DACK including a downlink frame to a client device within a predetermined time of receiving an uplink frame without having to contend for network resources. Furthermore, the techniques reduce downlink frames with missed deadlines as the downlink frames are sent as DACKs without contention. In addition, the delays can save client device battery resources, as the client devices can sleep when not sending or receiving frames. These techniques are described in more detail herein.

Figure 5:
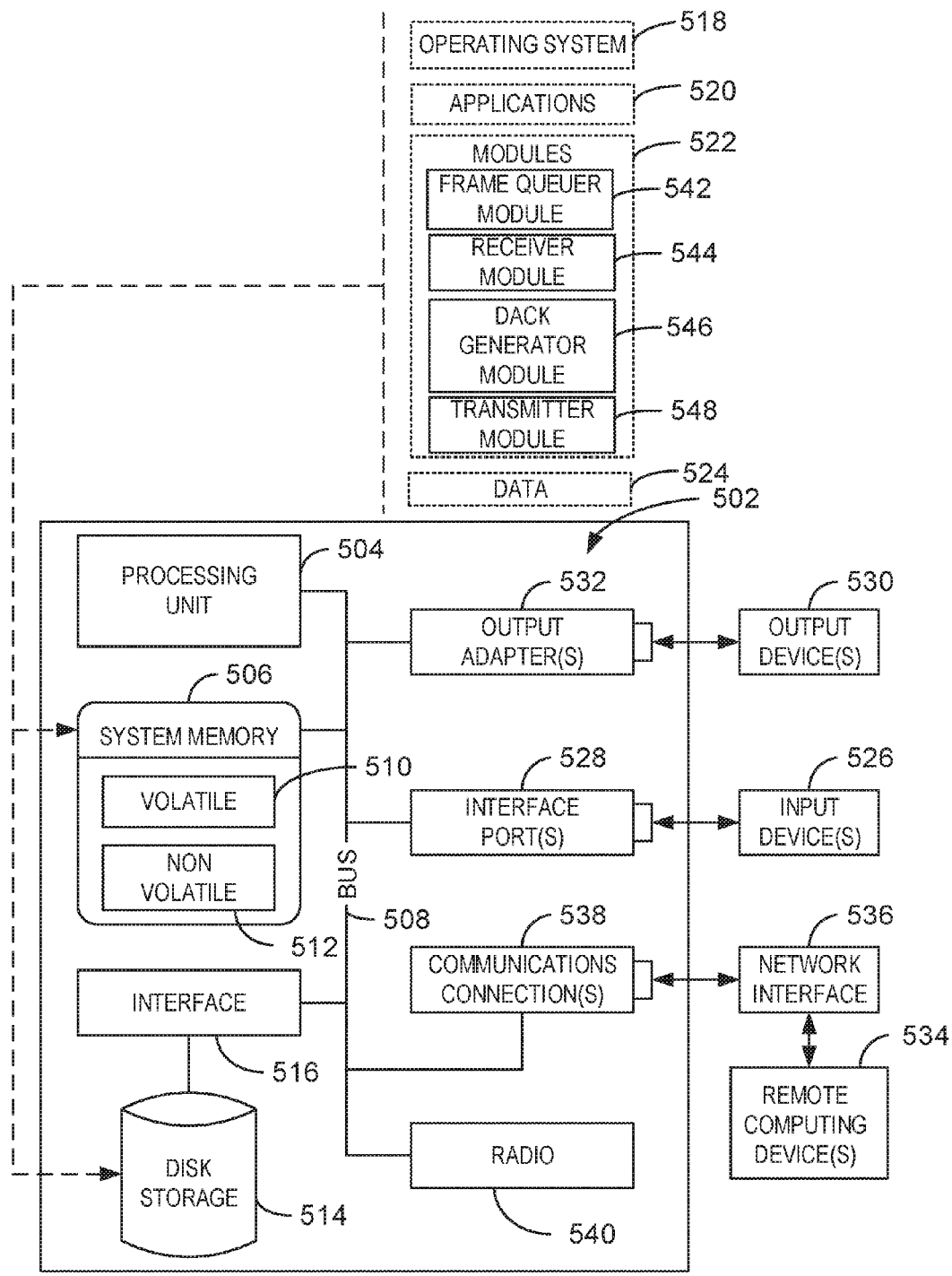
FIG. 5 is a block diagram of an example system for delaying network frames at client devices.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 5, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. For example, the phrase "configured to" can refer to a structure of an associated hardware element that can implement the associated functionality. The phrase "configured to" can also refer to the coding design of associated structural coding elements such as modules to implement the associated function of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts of FIG. 2-4 below corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the disclosed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals.

FIG. 1 is a block diagram of an example operating environment configured for implementing various aspects of the techniques described herein. The example operating environment of FIG. 1 is referred to generally by the reference number 100.

The example operating environment 100 includes a host device 102, a client device 104, and a client device 106. For example, the host device 102 can be a gaming console and the client devices 104 and 106 can be wireless controllers. The client device 104 is coupled to the host device 102 via a link 108. For example, the link 108 can be a wireless local area network connection. The client device 106 is coupled to the host device 102 via a link 110. The client devices 104, 106 include delay modules 112, 114, respectively. The host device 102 includes a DACK module 116.

In the example operating environment 100, both client device 104 and client device 106 may have a network frame to send to the host device 102. For example, the client device 104 may have a first network frame that has a corresponding frame deadline later than the frame deadline corresponding to a second network frame to be sent by the client device 106. In some examples, the delay module 112 of the client device 104 can identify the first network frame to be sent to the host device 102. The delay module 112 can then delay the transmission of the first network frame to the host device 102 based on network information and/or the frame deadline corresponding to the network frame. For example, the network information can include predicted future traffic for the client device and/or a second network frame deadline corresponding to a second frame at a second client device. The frame deadline can correspond to an expiration time of the first network frame. In some examples, the frame deadline can be based on frame type.

In some examples, the delay module 112 can delay the transmission of the first network frame based on the detection or probability of a downlink frame for the client device 104 at the host device 102. For example, the host device 102 can have a queue including one or more frames to be sent to one or more client devices. In some examples, if the delay module 112 detects a probability that exceeds a threshold probability or presence of a downlink frame at the host device 102 for the client device 104, then the delay module 112 can cause the client device 102 to transmit the delayed network frame to the host device. In some examples, the probability can be computed using frame history. For example, the probability can be computed based on the time that the last frame was received. In some examples, the probability can be based on application. For example, the probability can be based on whether the frames are associated with a Voice-over-IP (VoIP) or chat application. In some examples, the network frame may have been delayed by the delay module 112 in response to detecting that the deadline of the network frame is later than one or more other network frames. In some examples, the host device 102 can receive the first network frame. The DACK module 116 of the host device 102 can generate a data-acknowledgement (DACK) frame including the downlink frame in response to receiving the first network frame. The host device 102 can then send the DACK frame to the client device 104 within a predetermined time of receiving the first network frame. For example, the predetermined time can be equal to a Short Interframe Space (SIFS) period. The host device 102 may thus send the queued frame to the client device without contending for the network medium. Moreover, the second client device 106 may have also sent a network frame and received a DACK frame during the time in which the first network frame was delayed. Thus, the second client device 106 sent its network frame with a higher priority without contending with the client device 104 or the host device 102 for access to the network medium.

The diagram of FIG. 1 is not intended to indicate that the example operating environment 100 is to include all of the components shown in FIG. 1. Rather, the example operating environment 100 can include fewer or additional components not illustrated in FIG. 1 (e.g., additional host devices, client devices, etc.).

Figure 2:
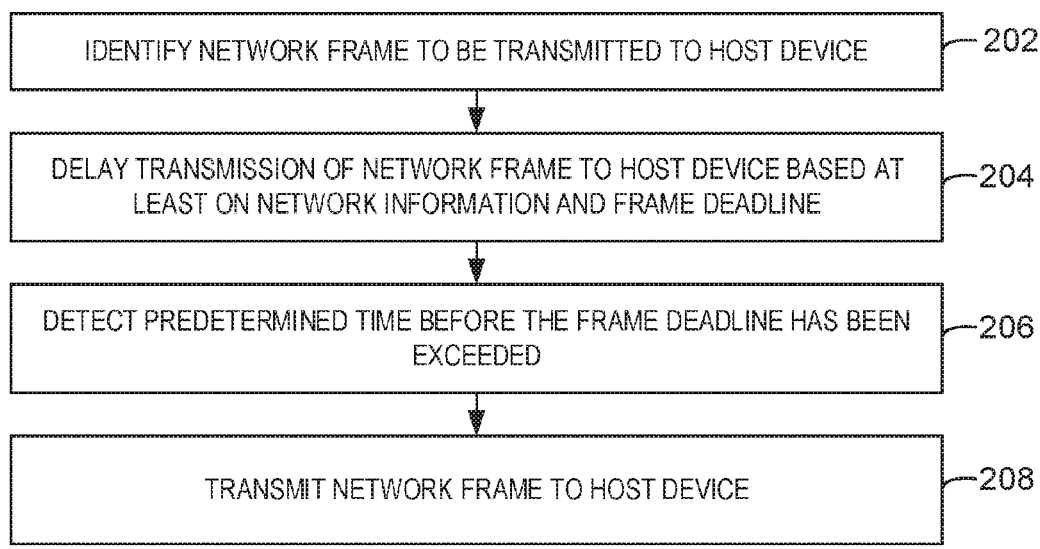
FIG. 2 is a process flow diagram of an example method for delaying network frames.

FIG. 2 shows a process flow diagram of an example method for delaying network frames. The example method is generally referred to by the reference number 200. The example method 200 can be performed by either of the client devices 104, 106 of FIG. 1 above.

At block 202, the client device identifies a network frame to be transmitted to a host device. For example, the client device may be a wireless controller sending a command via the network frame to a host gaming console. In some examples, the network frames can be prioritized or ranked according to the associated frame deadline for each network frame.

At block 204, the client device can delay transmission of the network frame to the host device based at least on the network information and a frame deadline. For example, the frame deadline can be an expiration time for the network frame. In some examples, if the network frame is not sent within the frame deadline, then the network frame has no value. For example, the frame deadline can be a timestamp in the header of a network frame. The client device can read the corresponding timestamp to identify the deadline for each network frame. The network information can include a second network frame deadline corresponding to a second frame at a second client device and/or calculated probability of future traffic for the client device. For example, the probability can be calculated based on frame history or the application that the frame is associated with.

At block 206, the client device detects a predetermined time before the frame deadline has been exceeded. For example, the predetermined time can be a short duration of time before the frame deadline. For example, the client can determine the time based on history, the length of the frame, the modulation being used, and the amount of contention in the network. In some examples, the time can be anywhere from a few hundred microseconds to a few milliseconds.

At block 208, the client device transmits the network frame to the host device. For example, the client device can transmit the network frame after a delay that enables the client device and/or the host device to transmit frames with shorter deadlines before the network frame. Thus, frames that are closer to their deadline can be prioritized over frames that are farther away from their deadline.

In one embodiment, the process flow diagram of FIG. 2 is intended to indicate that the steps of the method 200 are to be executed in a particular order. Alternatively, in other embodiments, the steps of the method 200 can be executed in any suitable order and any suitable number of the steps of the method 200 can be included. Further, any number of additional steps may be included within the method 200, depending on the specific application.

Figure 3:
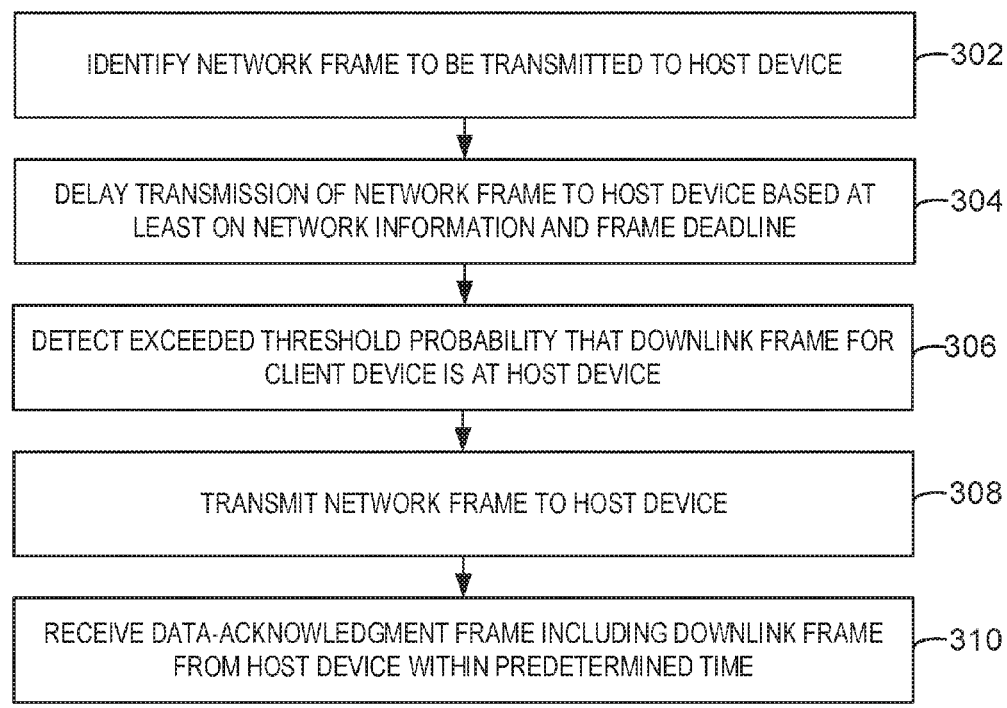
FIG. 3 is a process flow diagram of an example method for delaying network frames.

FIG. 3 shows a process flow diagram of an example method for delaying network frames. The example method is generally referred to by the reference number 300. The example method 300 can be performed by either of the client devices 104, 106 of FIG. 1 above.

At block 302, the client device identifies a network frame to be transmitted to a host device. For example, the client device may be a wireless controller sending a command via the network frame to a host gaming console.

At block 304, the client device delays transmission of the network frame to the host device based at least on the network information and a frame deadline. For example, the network information can include a second network frame deadline corresponding to a second frame at a second client device and/or calculated probability of future traffic for the client device. The frame deadline can be an expiration time for the network frame. The deadlines can be based on the frame type, which in turn can be defined by the application. For example, the frame type can include video frames, gaming frames, etc.

At block 306, the client device detects an exceeded threshold probability that a downlink frame for the client device is at the host device. For example, the downlink frame can be feedback for the client device from the host device. In some examples, the client device can predict a threshold probability of a downlink frame for the client device at the host device based on previously received frames and/or sent network frames.

At block 308, the client device transmits the network frame to the host device. For example, the network frame can be transmitted via a wireless local area network connection.

At block 310, the client device receives a data-acknowledgment (DACK) frame including the downlink frame from the host device frame within a predetermined time. For example, the DACK frame can include an acknowledgement (ACK) indicating a receipt of the network frame in addition to the downlink frame. In some examples, the client DACK can be received from the host device within a predetermined time of transmitting the network frame. For example, the predetermined time can be a SIFS period.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included. Further, any number of additional steps may be included within the method 300, depending on the specific application.

Figure 4:
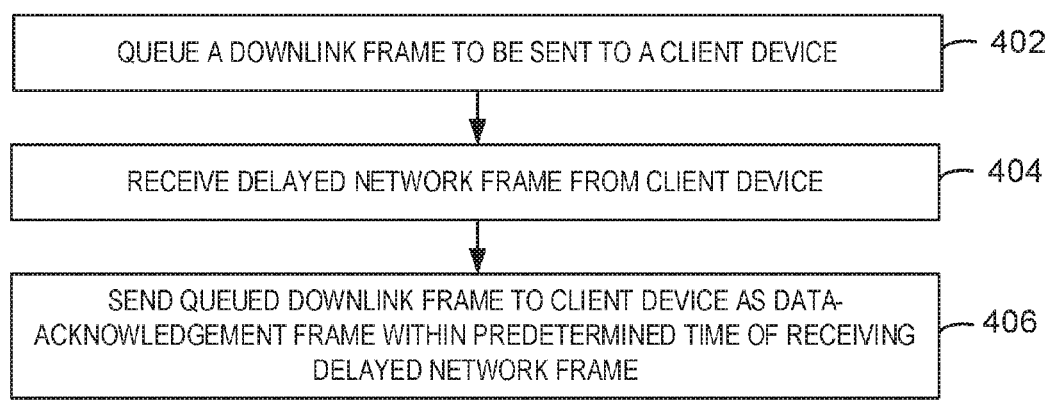
FIG. 4 is a process flow diagram of an example method for sending DACK frames in response to receiving delayed network frames.

FIG. 4 shows a process flow diagram of an example method for sending DACK frames in response to receiving delayed network frames. The example method is generally referred to by the reference number 400 and can be implemented using computer 502 as described below. The example method 400 can be performed by the host device of FIG. 1 above.

At block 402, the host device queues a network frame to be sent to a client device. For example, the client device may be a wireless controller and the host device may be gaming console. The queued network frame may be feedback for the client device. For example, the feedback may include any suitable information.

At block 404, the host device receives a delayed network frame from the client device. For example, the delayed network frame can be delayed based on network information or a frame deadline associated with the delayed network frame. In some examples, the host device may not have information that the frame is delayed. For example, the host may be able to predict a delayed frame to a frame that is lost. In a network with high latency, the frame may be delayed. The delay may also be signaled explicitly by an application. In some examples, the host device may detect that the frame is delayed and use the information to save power by sleeping.

At block 406, the host device generates a data-acknowledgement (DACK) frame including the queued network frame. For example, the DACK frame can include both an acknowledgement (ACK) indicating the receipt of the delayed frame in addition to the queued frame.

At block 408, the host device sends the DACK frame to the client device within a predetermined time of receiving the delayed network frame. For example, the predetermined time can be a SIFS period.

In one embodiment, the process flow diagram of FIG. 4 is intended to indicate that the steps of the method 400 are to be executed in a particular order. Alternatively, in other embodiments, the steps of the method 400 can be executed in any suitable order and any suitable number of the steps of the method 400 can be included. Further, any number of additional steps may be included within the method 400, depending on the specific application.

FIG. 5 is a block diagram of an example system for wireless control. The example system 500 includes a computing device 502. The computing device 502 includes a processing unit 504, a system memory 506, and a system bus 508. For example, the computing device 502 may be the host device 102 or the client device 104 of FIG. 1 above. In some examples, the computing device 502 can be a gaming console, a personal computer (PC), an accessory console, a gaming controller, among other computing devices. In some examples, the computing device 502 can be a node in a cloud network.

The system bus 508 couples system components including, but not limited to, the system memory 506 to the processing unit 504. The processing unit 504 can be any of various available processors. Dual microprocessors and other multiprocessor architectures also can be employed as the processing unit 504.

The system bus 508 can be any of several types of bus structure, including the memory bus or memory controller, a peripheral bus or external bus, and a local bus using any variety of available bus architectures known to those of ordinary skill in the art. The system memory 506 includes computer-readable storage media that includes volatile memory 510 and nonvolatile memory 512.

The basic input/output system (BIOS), containing the basic routines to transfer information between elements within the computer 502, such as during start-up, is stored in nonvolatile memory 512. By way of illustration, and not limitation, nonvolatile memory 512 can include read-only memory (ROM), programmable ROM (PROM), electrically programmable ROM (EPROM), electrically erasable programmable ROM (EEPROM), or flash memory.

Volatile memory 510 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLinkTM DRAM (SLDRAM), Rambus® direct RAM (RDRAM), direct Rambus® dynamic RAM (DRDRAM), and Rambus® dynamic RAM (RDRAM).

The computer 502 also includes other computer-readable media, such as removable/non-removable, volatile/non-volatile computer storage media. FIG. 5 shows, for example a disk storage 514. Disk storage 514 includes, but is not limited to, devices like a magnetic disk drive, floppy disk drive, tape drive, Jaz drive, Zip drive, LS-210 drive, flash memory card, or memory stick.

In addition, disk storage 514 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 514 to the system bus 508, a removable or non-removable interface is typically used such as interface 516.

It is to be appreciated that FIG. 5 describes software that acts as an intermediary between users and the basic computer resources described in the suitable operating environment 500. Such software includes an operating system 518. Operating system 518, which can be stored on disk storage 514, acts to control and allocate resources of the computer 502.

System applications 520 take advantage of the management of resources by operating system 518 through program modules 522 and program data 524 stored either in system memory 506 or on disk storage 514. It is to be appreciated that the disclosed subject matter can be implemented with various operating systems or combinations of operating systems.

A user enters commands or information into the computer 502 through input devices 526. Input devices 526 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. In some examples, the client device of FIG. 1 may be an input device 526 of the host device. The input devices 526 connect to the processing unit 504 through the system bus 505 via interface ports 528. Interface ports 528 include, for example, a serial port, a parallel port, a game port, and a universal serial bus (USB).

Output devices 530 use some of the same type of ports as input devices 526. Thus, for example, a USB port may be used to provide input to the computer 502, and to output information from computer 502 to an output device 530.

Output adapter 532 is provided to illustrate that there are some output devices 530 like monitors, speakers, and printers, among other output devices 530, which are accessible via adapters. The output adapters 532 include, by way of illustration and not limitation, video and sound cards that provide a means of connection between the output device 530 and the system bus 508. It can be noted that other devices and systems of devices provide both input and output capabilities such as remote computing devices 534.

The computer 502 can be a server hosting various software applications in a networked environment using logical connections to one or more remote computers, such as remote computing devices 534. The remote computing devices 534 may be client systems configured with web browsers, PC applications, mobile phone applications, and the like. The remote computing devices 534 can be a personal computer, a server, a router, a network PC, a workstation, a microprocessor based appliance, a mobile phone, a peer device or other common network node and the like, and typically includes many or all of the elements described relative to the computer 502.

Remote computing devices 534 can be logically connected to the computer 502 through a network interface 536 and then connected via a communication connection 538, which may be wireless. Network interface 536 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 538 refers to the hardware/software employed to connect the network interface 536 to the bus 508. While communication connection 538 is shown for illustrative clarity inside computer 502, it can also be external to the computer 502. The hardware/software for connection to the network interface 536 may include, for exemplary purposes, internal and external technologies such as, mobile phone switches, modems including regular telephone grade modems, cable modems and DSL modems, ISDN adapters, and Ethernet cards.

The computer 502 can further include a radio 540. For example, the radio 540 can be any suitable wireless local area network connection radio. In some examples, the radio 540 may support one or more wireless bands.

An example processing unit 504 for the server may be a computing cluster. Additionally, the disk storage 514 can store various types of data 524 used for delaying network frames. For example, the disk storage 514 may be an enterprise data storage system. In some examples, the disk storage 514 may store data 524 such as network frames to be queued.

The computer 502 includes one or more modules 522 configured to enable delaying of network frames, including a frame queuer module 542, a receiver module 544, a DACK generator module 546, and a transmitter module 548. The frame queuer module 542, receiver module 544, DACK generator module 546, and transmitter module 548, refer to structural elements that perform associated functions. In some embodiments, the functionalities of the frame queuer module 542, receiver module 544, DACK generator module 546, and transmitter module 548, can be implemented with logic, wherein the logic, as referred to herein, can include any suitable hardware (e.g., a processor, among others), software (e.g., an application, among others), firmware, or any combination of hardware, software, and firmware. The frame queuer module 542 can queue a network frame to be sent to a client device. In some examples, all frames received at the host device can be stored in the queue until they are sent to a client device. For example, the client device may be a wireless controller. In some examples, multiple queues can be maintained. For example, a queue can be maintained for each priority level of the frames. The receiver module 544 can receive a delayed network frame from the client device. For example, the delayed network frame can be an uplink frame. In some examples, the delayed network frame may have been delayed probabilistically based on network information and a frame deadline. For example, the network information can include predicted future traffic for the client device and/or a second network frame deadline corresponding to a second frame at a second client device. The frame deadline can be an expiration time of the network frame. The DACK generator module 546 can generate a data-acknowledgement (DACK) frame including the queued network frame. The transmitter module 548 can send the DACK frame to the client device within a predetermined time of receiving the delayed network frame. For example, the predetermined time can be a SIFS period.

It is to be understood that the block diagram of FIG. 5 is not intended to indicate that the computing system 500 is to include all of the components shown in FIG. 5. Rather, the computing system 500 can include fewer or additional components not illustrated in FIG. 5 (e.g., additional applications, additional modules, additional memory devices, additional network interfaces, additional MACs, etc.). Furthermore, any of the functionalities of the frame queuer module 542, the receiver module 544, the DACK generator module 546, and the transmitter module 548 can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 6:
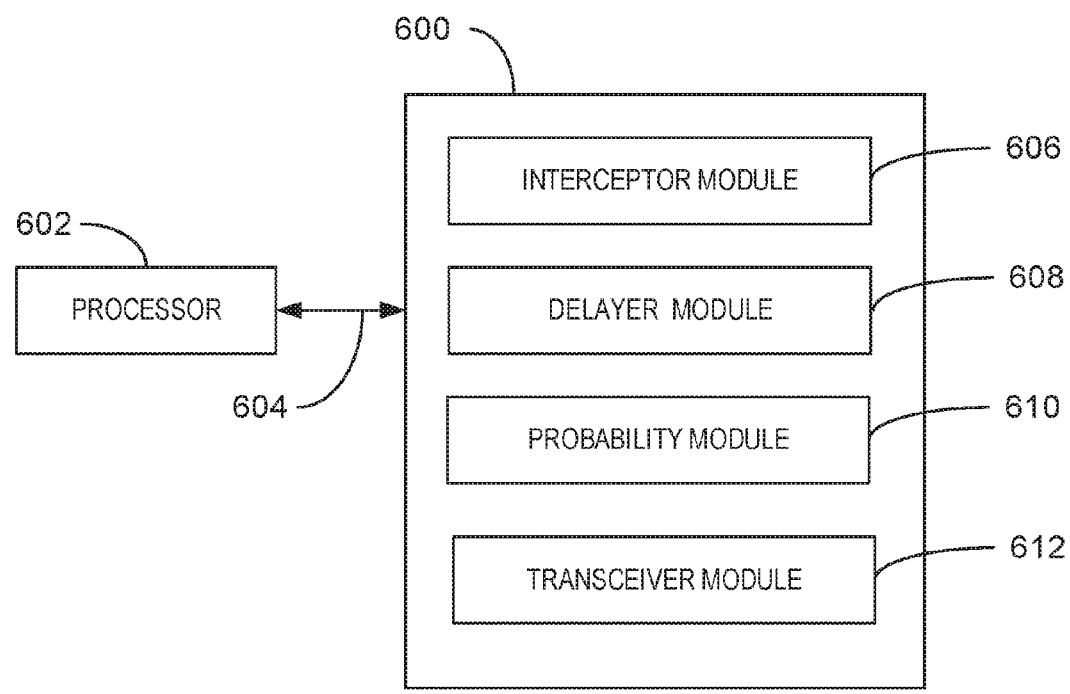
FIG. 6 is a block diagram showing an example tangible, computer-readable storage medium that can be used for delaying network frames at a client device.

FIG. 6 is a block diagram showing an example tangible, computer-readable storage medium that can be used for delaying network frames at a client device. The tangible, computer-readable storage media 600 can be accessed by a processor 602 over a computer bus 604. Furthermore, the tangible, computer-readable storage media 600 can include code to direct the processor 602 to perform the current methods.

The various software components discussed herein can be stored on the tangible, computer-readable storage media 600, as indicated in FIG. 6. For example, the tangible computer-readable storage media 600 can include an identifier module 606, a delayer module 608, a frame detector module 610, and a transceiver module 612. The identifier module 606, delayer module 608, frame detector module 610, and transceiver module 612, refer to structural elements that perform associated functions. In some embodiments, the functionalities of the identifier module 606, delayer module 608, frame detector module 610, and transceiver module 612, can be implemented with logic, wherein the logic, as referred to herein, can include any suitable hardware (e.g., a processor, among others), software (e.g., an application, among others), firmware, or any combination of hardware, software, and firmware. In some implementations, the identifier module 606 can include code to identify a network frame to be transmitted to a host device at a client device. For example, the client device can be a wireless controller and the host device can be a gaming console. The delayer module 608 can include code to delay transmission of the network frame to the host device based on the network information and a frame deadline. For example, the frame deadline can be based on a service type of the network frame. In some examples, the network information can include a second network frame deadline corresponding to a second frame at a second client device. For example, the second client device may be a higher priority client device. In some examples, the network information can include predicted future traffic for the client device. For example, the network information may include probabilities of future traffic. In some examples, the network information can include scheduled times of frames for other client devices in a network, the network frame to be transmitted at a time corresponding to a midpoint between scheduled times of two of the clients. The frame detector module 610 can include code to detect an exceeded threshold probability of a downlink frame for the client device at the host device. The transceiver module 612 can include code to transmit the network frame to the host device in response to detecting the downlink frame. In some examples, the transceiver module 612 can include code to receive a data-acknowledgment frame from the host device including the downlink frame. In some examples, the transceiver module 612 can include code to transmit the network frame in response to detecting that a predetermined time before the frame deadline is reached.

It is to be understood that any number of additional software components not shown in FIG. 6 can be included within the tangible, computer-readable storage media 600, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

This example provides for an example system for delaying network frames. The example system includes a processor and a computer-readable memory storage device storing executable instructions. The executable instructions can cause the processor to identify a network frame to be transmitted to a host device at a client device. The executable instructions can cause the processor to delay transmission of the network frame to the host device based at least on the network information and a frame deadline. Alternatively, or in addition, the processor can further detect an exceeded threshold probability that a downlink frame for the client device is at a host device. Alternatively, or in addition, the processor can also transmit the network frame to the host device in response to detecting the exceeded threshold probability. Alternatively, or in addition, the processor is to further receive a data-acknowledgment frame from the host device comprising the downlink frame. Alternatively, or in addition, the processor is to transmit the network frame in response to detecting that a predetermined time before the frame deadline is reached. Alternatively, or in addition, the frame deadline is based at least on a service type of the network frame. Alternatively, or in addition, the network information comprises a second network frame deadline corresponding to a second frame at a second client device. Alternatively, or in addition, the second client device comprises a higher priority client device. Alternatively, or in addition, the network information comprises predicted probability of future traffic for the client device. Alternatively, or in addition, the network information comprises scheduled times of frames for other client devices in a network. Alternatively, or in addition, the network frame to be transmitted at a time comprising a midpoint between scheduled times of two of the other client devices. Alternatively, or in addition, the network frame is delayed probabilistically based on predicted traffic or network conditions.

EXAMPLE 2

This example provides for an example system for delaying network frames. The example system includes a processor and a computer-readable memory storage device storing executable instructions. The executable instructions can cause the processor to queue a network frame to be sent to a client device. The executable instructions can cause the processor to receive a delayed network frame from the client device. The executable instructions can cause the processor to generate a data-acknowledgement (DACK) frame comprising the queued network frame and send the DACK frame to the client device within a predetermined time of receiving the delayed network frame. Alternatively, or in addition, the predetermined time comprises a SIFS period. Alternatively, or in addition, the delayed network frame comprises an uplink frame. Alternatively, or in addition, the delayed network frame is delayed probabilistically based at least on network information and a frame deadline. Alternatively, or in addition, the client device comprises a wireless controller.

EXAMPLE 3

This example provides for an example method for delaying network frames. The example method includes identifying a network frame to be transmitted to a host device at a client device. The example method also includes delaying transmission of the network frame to the host device based at least on the network information and the frame deadline. Alternatively, or in addition, the example method can include detecting a downlink frame for the client device at the host device. Alternatively, or in addition, the example method can include transmitting the delayed network frame to the host device in response to detecting the downlink frame. Alternatively, or in addition, the example method can include receiving a data-acknowledgment frame comprising the downlink frame from the host device within a predetermined time of transmitting the delayed network frame. Alternatively, or in addition, the predetermined time comprises a SIFS period. Alternatively, or in addition, the example method can include transmitting the delayed network frame in response to detecting that a predetermined time before the frame deadline is reached.

EXAMPLE 4

This example provides for an example one or more computer-readable memory storage devices for storing computer readable instructions that, when executed by one or more processing devices, instruct delaying network frames at a client device. The computer-readable instructions may include code to identify a network frame to be transmitted to a host device at a client device. The computer-readable instructions may include code to delay transmission of the network frame to the host device based on the network information and a frame deadline. The computer-readable instructions may include code to detect an exceeded threshold probability of a downlink frame for the client device at the host device. The computer-readable instructions may include code to transmit the network frame to the host device in response to detecting the downlink frame. Alternatively, or in addition, the client device can be a wireless controller and the host device can be a gaming console. Alternatively, or in addition, the frame deadline can be based on a service type of the network frame. Alternatively, or in addition, the network information can include a second network frame deadline corresponding to a second frame at a second client device. Alternatively, or in addition, the second client device may be a higher priority client device. Alternatively, or in addition, the network information can include predicted future traffic for the client device. Alternatively, or in addition, the network information can include scheduled times of frames for other client devices in a network, the network frame to be transmitted at a time corresponding to a midpoint between scheduled times of two of the clients. Alternatively, or in addition, the transceiver module 612 can include code to receive a data-acknowledgment frame from the host device including the downlink frame. Alternatively, or in addition, the transceiver module 612 can include code to transmit the network frame in response to detecting that a predetermined time before the frame deadline is reached.

What has been described above includes examples of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the disclosed subject matter. In this regard, it will also be recognized that the innovation includes a system as well as a computer-readable storage media having computer-executable instructions for performing the acts and events of the various methods of the disclosed subject matter.

There are multiple ways of implementing the disclosed subject matter, e.g., an appropriate API, tool kit, driver code, operating system, control, standalone or downloadable software object, etc., which enables applications and services to use the techniques described herein. The disclosed subject matter contemplates the use from the standpoint of an API (or other software object), as well as from a software or hardware object that operates according to the techniques set forth herein. Thus, various implementations of the disclosed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the disclosed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for delaying network frames, comprising a client device, the client device comprising:
   a processor; and
   a computer-readable memory storage device storing executable instructions that, based on an execution by the processor, cause the processor to:
   identify a network frame to be transmitted to a host device from the client device;
   delay transmission of the network frame to the host device based at least on network information and a frame deadline;
   predict a probability that a downlink frame for the client device is at the host device, based on previously received frames from the host device; and
   transmit the network frame to the host device in response to detecting the predicted probability exceeds a threshold probability.

2. The system of claim 1, wherein the processor is to further receive a data-acknowledgment frame from the host device comprising the downlink frame.

3. The system of claim 1, wherein the processor is to transmit the network frame in response to detecting that a predetermined time before the frame deadline is reached.

4. The system of claim 1, wherein the frame deadline is based at least on a service type of the network frame.

5. The system of claim 1, wherein the network information comprises a second network frame deadline corresponding to a second frame at a second client device.

6. The system of claim 5, wherein the second client device comprises a higher priority client device.

7. The system of claim 1, wherein the network information comprises a probability of future traffic for the client device.

8. The system of claim 1, wherein the network information comprises scheduled times of frames for other client devices in a network, the network frame to be transmitted at a time comprising a midpoint between scheduled times of two of the other client devices.

9. The system of claim 1, wherein the network frame is delayed probabilistically based on predicted traffic or network conditions.

10. A method for delaying network frames, comprising:
    identifying a network frame to be transmitted to a host device from a client device;
    delaying transmission of the network frame to the host device based at least on network information and a frame deadline;
    predicting a probability that a downlink frame for the client device is at the host device, based on previously received frames from the host device; and
    transmitting the network frame to the host device in response to detecting the predicted probability exceeds a threshold probability.

11. The method of claim 10, further comprising receiving a data-acknowledgment frame comprising the downlink frame from the host device within a predetermined time of transmitting the delayed network frame.

12. The method of claim 9, wherein the predetermined time comprises a SIFS period.

13. The method of claim 10, further comprising transmitting the delayed network frame in response to detecting that a predetermined time before the frame deadline is reached.

\* \* \* \* \*